(12) United States Patent
Shiota

(10) Patent No.: US 6,542,505 B1
(45) Date of Patent: Apr. 1, 2003

(54) ATM SWITCHING APPARATUS WITH SERVER FUNCTION

(75) Inventor: Yoshiaki Shiota, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/131,230

(22) Filed: Aug. 7, 1998

(30) Foreign Application Priority Data

Aug. 26, 1997 (JP) .............................................. 9-244609

(51) Int. Cl.[7] .............................................. H04L 12/56
(52) U.S. Cl. ..................... 370/395.1; 709/203
(58) Field of Search .............................. 370/389, 392, 370/395.1, 398, 395.2, 395.51, 401; 709/203, 206, 216, 217

(56) References Cited

U.S. PATENT DOCUMENTS

| | | | | |
|---|---|---|---|---|
| 5,581,552 A | * | 12/1996 | Civanlar et al. | ............ 370/396 |
| 5,612,897 A | * | 3/1997 | Rege | .......................... 709/219 |
| 5,878,212 A | * | 3/1999 | Civanlar et al. | ............ 709/203 |
| 6,189,043 B1 | * | 2/2001 | Buyukkoc et al. | .......... 709/241 |
| 6,192,050 B1 | * | 2/2001 | Stovall | ........................ 370/389 |

FOREIGN PATENT DOCUMENTS

JP        7-264196        10/1995

* cited by examiner

*Primary Examiner*—Chau Nguyen
*Assistant Examiner*—Soon-Dong Hyun
(74) *Attorney, Agent, or Firm*—Whitham, Curtis & Christofferson, P.C.

(57) ABSTRACT

An asynchronous transfer mode (ATM) switching apparatus is provided in a communication network, and includes an ATM switch for switching a path for a cell. A control unit controls the ATM switch. A network interface board is installed in a slot to interface between the ATM switch and a communication channel for the cell. A server board is installed in a slot in which the network interface board can be installed. The server board receives cells from said communication channel through said network interface board and said ATM switch under control of the control unit to provide a service. The server board outputs cells corresponding to the service such that the cells are sent to the communication channel through the network interface board and the ATM switch under control of said control unit.

10 Claims, 6 Drawing Sheets

ATM SWITCHING APPARATUS WITH SERVER FUNCTION

BACKGROUND OF THE INVENTION

1. Field of the Invention

The present invention relates to an ATM (asynchronous transfer mode) switching apparatus, and more particularly to an ATM switching apparatus with a server function accomplished by a server board.

2. Description of the Related Art

FIG. 1 shows the structure of a conventional multimedia server which is proposed in Japanese Laid Open Patent Application (JP-A-Heisei 7-264196). In the multimedia server, multimedia data bases and a network interface are coupled by an ATM switch apparatus.

As shown in FIG. 1, the conventional multimedia server is composed of a plurality of network interface sections 1 to 4, an ATM switch apparatus 5, a control unit 6, a plurality of data base interface sections 7 to 9, and a plurality of multimedia data bases 10 to 12. Thus, the multimedia server using the ATM switch apparatus 5 is realized. That is, a multimedia data is acquired from the network interface section via the ATM switch apparatus 5.

In the conventional multimedia server, it is presumed that there are few request but a large amount of data is required by each of the requests. Therefore, a large-scale storage is necessary to be provided in advance. For this reason, the conventional multimedia server having such a structure is redundant for a LAN emulation server on an ATM-LAN in which a small amount of data is transmitted for each of a lot of requests.

Also, the method of adding a data base section is not definite. Further, the single control unit is used. The control unit is composed of a processor to determine a complicated request and to reply the request. Therefore, when the number of requests are received from the network interface, the load of the control unit becomes heavy. Thus, there is a possibility that the whole throughput decreases.

In this manner, the conventional multimedia server has the following problems.

The first problem is in that the large-scale storage must be previously incorporated in the multimedia server.

The second problem is in that the method of adding a data base section is indefinite.

The third problem is in that the load of the control unit becomes heavy when the number of requests from the network interface increases. This is because all processes must be performed by the single control unit.

There is a case that a service of an upper layer than an ATM layer is provided as in an LAN (local area network) emulation server and NHRP (Next Hop Resolution Protocol) server. In this case, when a processor as a control unit for controlling the whole apparatus has a server function, the load of the processor becomes heavy. As a result, the processing efficiency decreases. In addition, since a memory area necessary for the server function is used as a memory area necessary for system control, the memory area used for the server is limited.

SUMMARY OF THE INVENTION

The present invention is accomplished to solve the above problems. Therefore, an object of the present invention is to provide an ATM switching apparatus in which the load of the control unit can be distributed by installing a server board.

Another object of the present invention is to provide an ATM switching apparatus in which the extension of server functions can be easily performed.

In order to achieve an aspect of the present invention, an asynchronous transfer mode (ATM) switching apparatus provided in a communication network, includes an ATM switch for switching a path for a cell. A control unit controls the ATM switch. A network interface board is installed to interface between the ATM switch and a communication channel for a cell. A server board receives cells from the communication channel through the network interface board and the ATM switch under control of the control unit to provide a service. Also, the server board outputs cells corresponding to the service such that the cells are sent to the communication channel through the network interface board and the ATM switch under control of the control unit.

The server board includes a storage unit for storing a service software, a converting unit and a processor. The converting unit converts the received cells into a reception packet to store the reception packet in the storage unit. Also, the converting unit converts a stored transmission packet to the sent cells to send to the ATM switch. The processor provides the service for the reception packet stored in the storage unit based on the service software to produce the transmission packet, and stores the transmission packet in the storage unit.

The server board can be installed in a physical slot in which the network interface board can be installed.

The ATM switching apparatus may further includes a plurality of the server boards including the server board. The plurality of server boards may provide the same service. In this case, the control unit includes a counter section for counting a number of requests for the service, each of the requests corresponding to the received cells, and controls the path based on the counter section.

Instead, the plurality of server boards may provide different services. In this case, the network interface board informs the service corresponding to the cells to the control unit, and the control unit controls the path based on the information.

DESCRIPTION OF THE PREFERRED EMBODIMENTS

The ATM switching apparatus of the present invention will be described below in detail with reference to the attached drawings.

In the ATM switching apparatus of the present invention, a server board is installed on the physical position in which a network interface board is possible to be installed in the ATM switching apparatus. The ATM switching apparatus is composed of the network interface boards, an ATM switch, and a CPU for the control. The server board is composed of a processor, a memory, and a converting unit.

In the server board, the processor executes a server software for realizing various kinds of service functions on an ATM-LAN. A packet received from a client is stored in the memory. The converting unit performs the conversion between a packet and ATM cells and transfer and receives the ATM cells to and from the ATM switch.

According to the present invention, the server board can be installed in the position where a line interface board can be installed. Therefore, the addition of the server board is easy.

Also, because a server process is performed on the server board, the load of the control unit can be made light and the ability of the server does not decreases.

Moreover, according to the present invention, a plurality of server boards of a single type or a plurality types can be operated at the same time.

Next, the server system of the present invention will be described below in detail with reference to the attached drawings.

Figure 1:
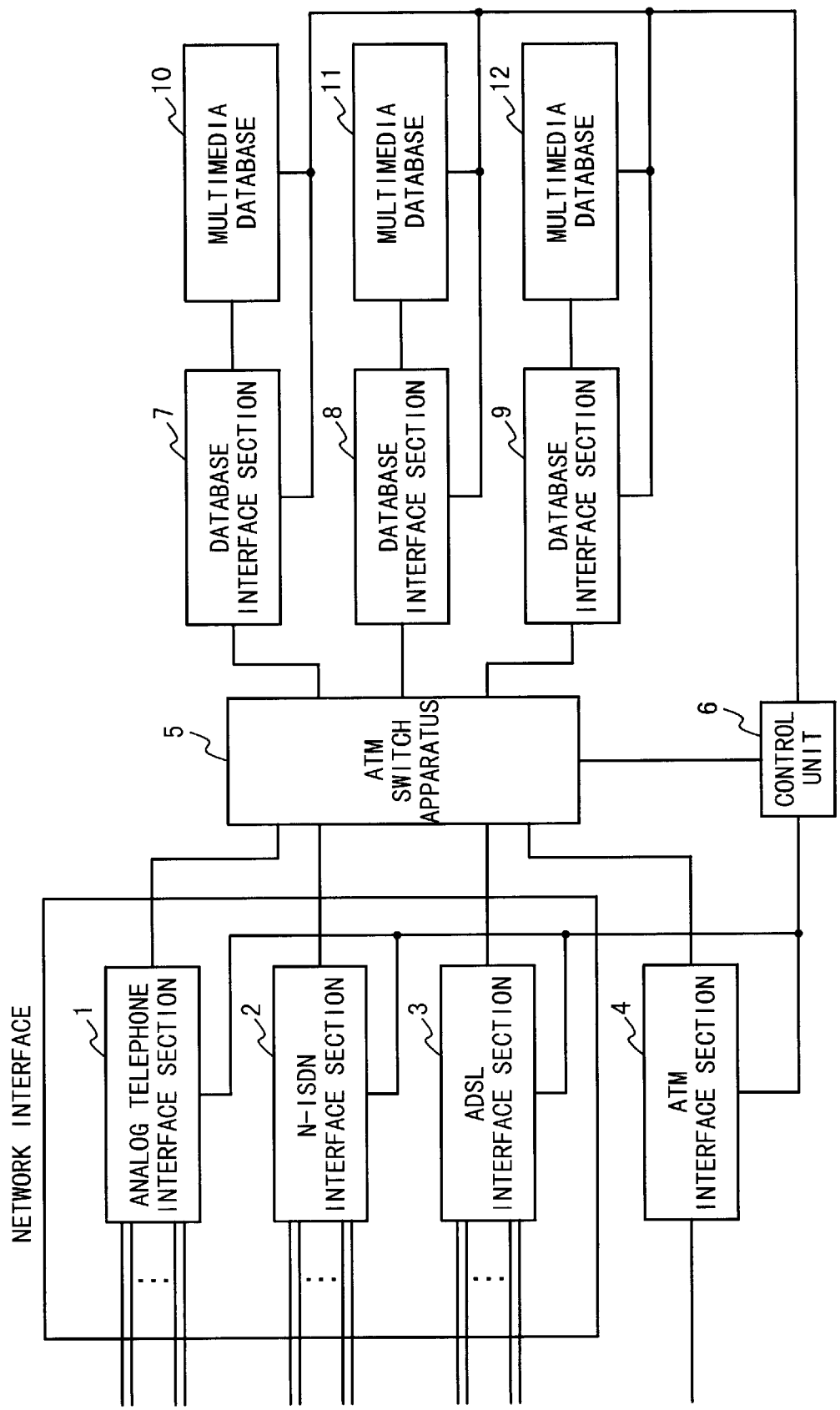
FIG. 1 is a block diagram illustrating an example of the structure of a conventional multimedia server.
Figure 2:
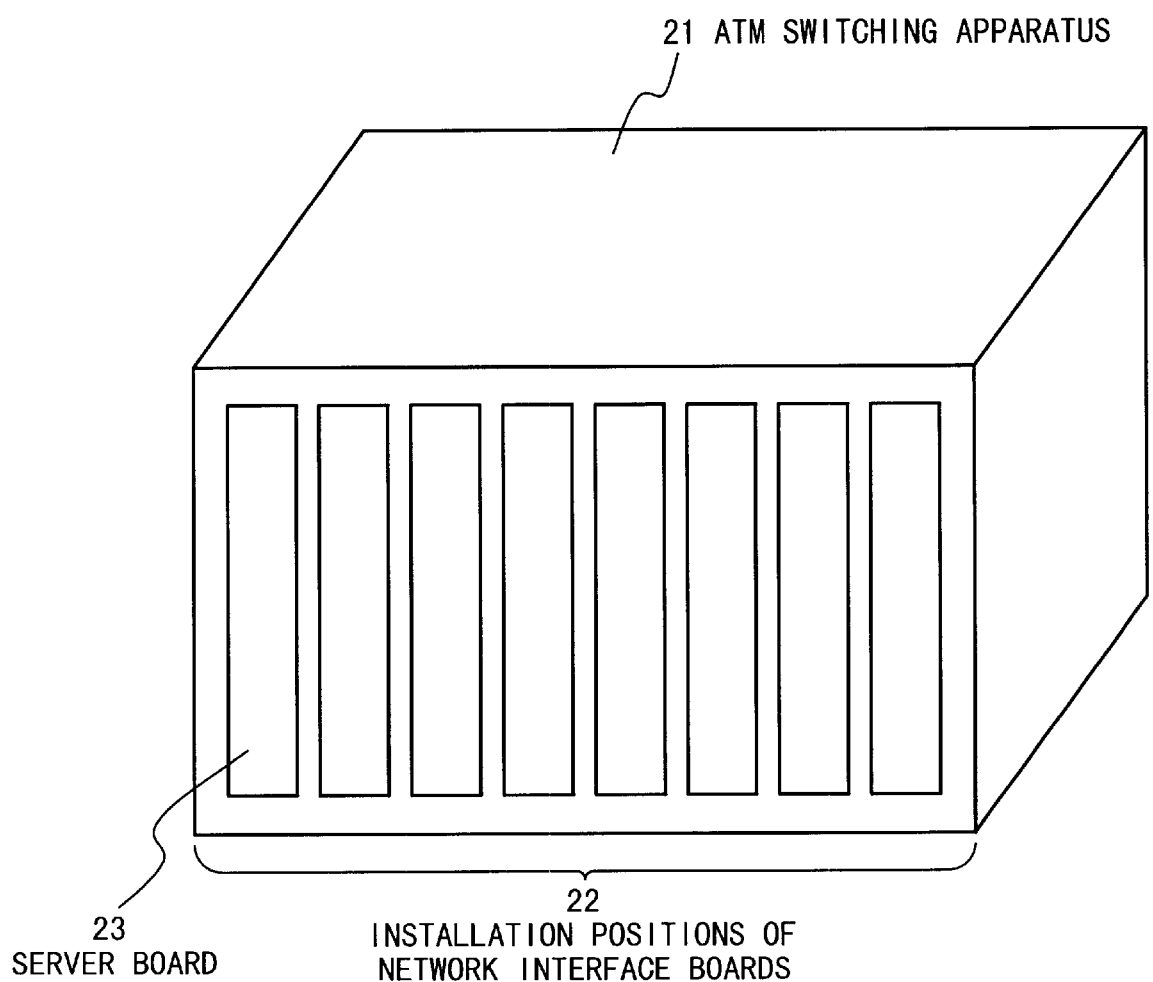
FIG. 2 is a perspective view of the ATM switching apparatus of the present invention.

FIG. 2 is a perspective view of a server system according to the first embodiment of the present invention. Referring to FIG. 2, an ATM switching apparatus 21 is possible for a plurality of network interface boards to be installed. The server board 23 can be installed in an optional one of positions 22 where various network interface boards can be installed. Also, One or more server boards 23 can be installed in optional positions. When the ATM switching apparatus 21 does not use any server board, it merely functions as the ATM switching apparatus.

Figure 3:
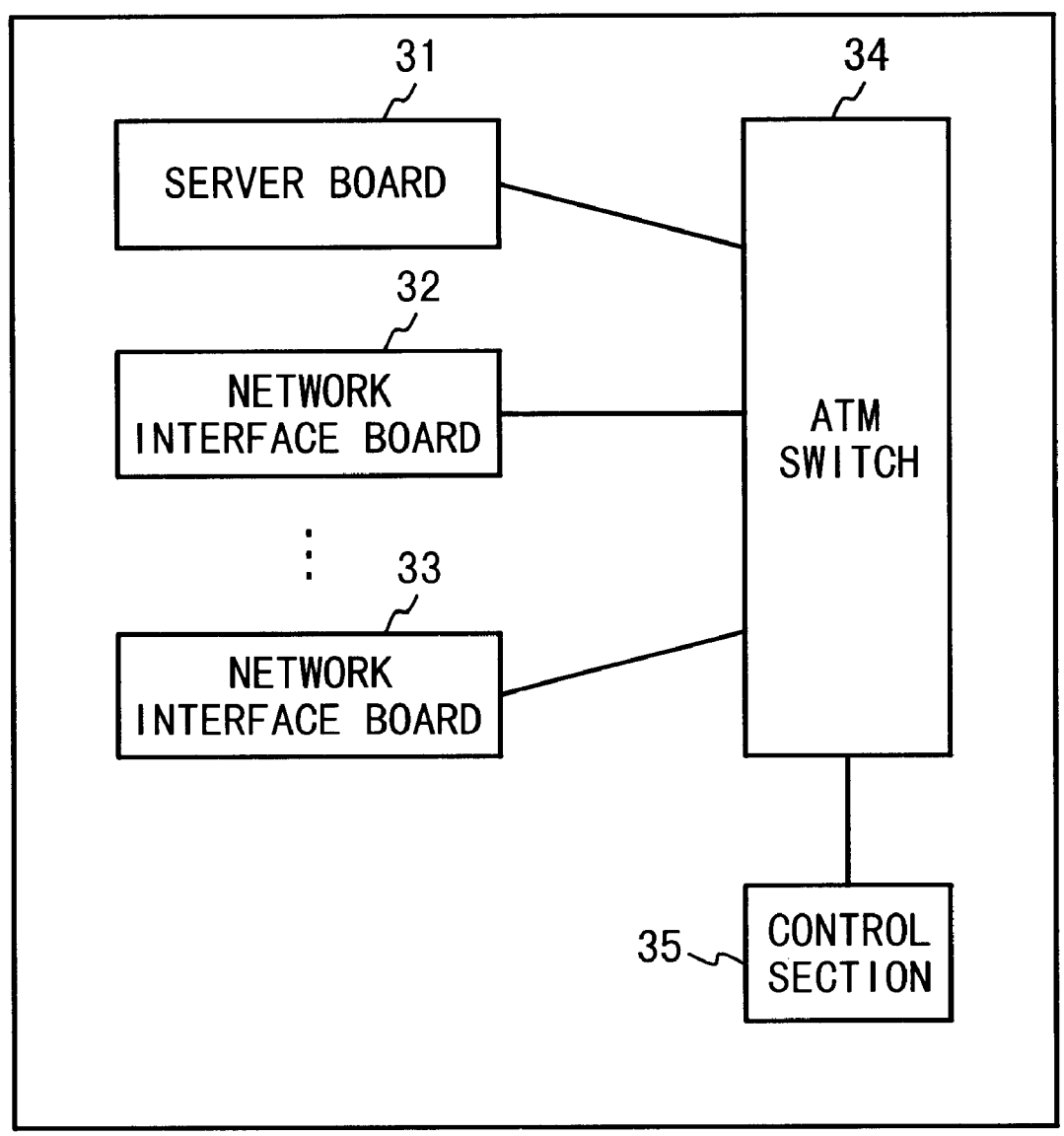
FIG. 3 is a block diagram illustrating the structure of the ATM switching apparatus according to a first embodiment of the present invention.

FIG. 3 is a block diagram illustrating the structure of the ATM switching apparatus 21 according to the first embodiment of the present invention. Referring to FIG. 3, the network interface boards 32 and 33 and the server board 31 are connected to the ATM switch 34 such that ATM cell switching is performed. The control section 35 monitors any faults of the server board 31 and network interface boards 32 and 33 and performs the initial setting of various ATM connections of the server board 31 and network interface boards 32 and 33. There may be a network interface board which does not communicate with the server board.

Figure 4:
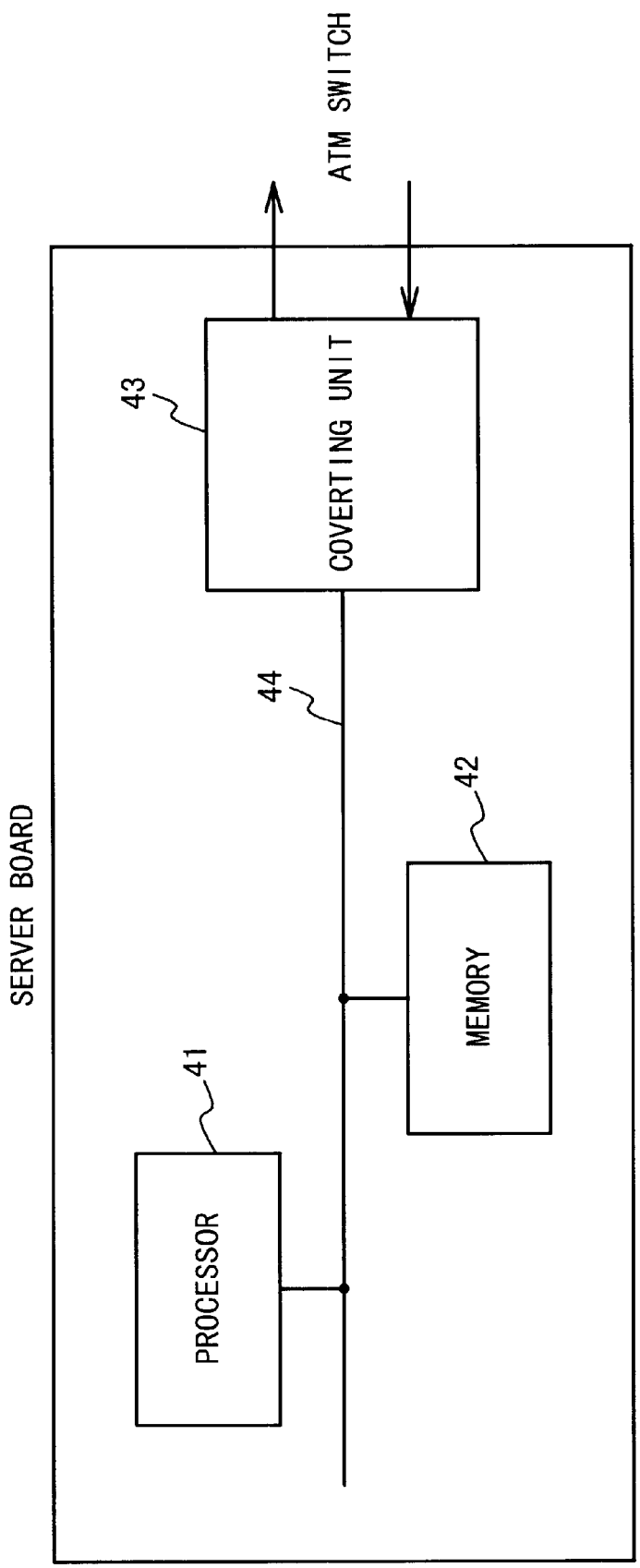
FIG. 4 is a block diagram illustrating the structure of a server board of the ATM switching apparatus according to the first embodiment of the present invention.

FIG. 4 is a block diagram illustrating the structure of the server board in the first embodiment of the present invention. Referring to FIG. 4, the server board is composed of a processor 41, a memory 42, a converting unit 43. The processor 41, the memory 42, the converting device 43 are connected to a processor bus 44.

The server software is stored in the memory 42 and is executed by the processor 41 to respond to a request from a client via a communication channel. The memory 42 is used for storing a packet corresponding to the request received from the client and for storing the server software itself. The converting unit 43 is used to perform conversion between ATM cells and a packet and to exchange the ATM cells with the ATM switch 34.

Next, the operation of the ATM switching apparatus according to the first embodiment of the present invention will be described below in detail.

The control section 35 shown in FIG. 3 performs the initial setting of the server board 31, network interface boards 32 and 33 and ATM switch 34 in advance. The network interface board 32 or 33 receives a request from the client in the form of ATM cells and transfers them to the ATM switch 34. The ATM switch 34 determines whether or not each of the ATM cells is destined to the server board 31 based on an identifier. The ATM switch 34 forwards the ATM cell to the server board 31 if the ATM cell is destined to the server board 31.

Figure 5:
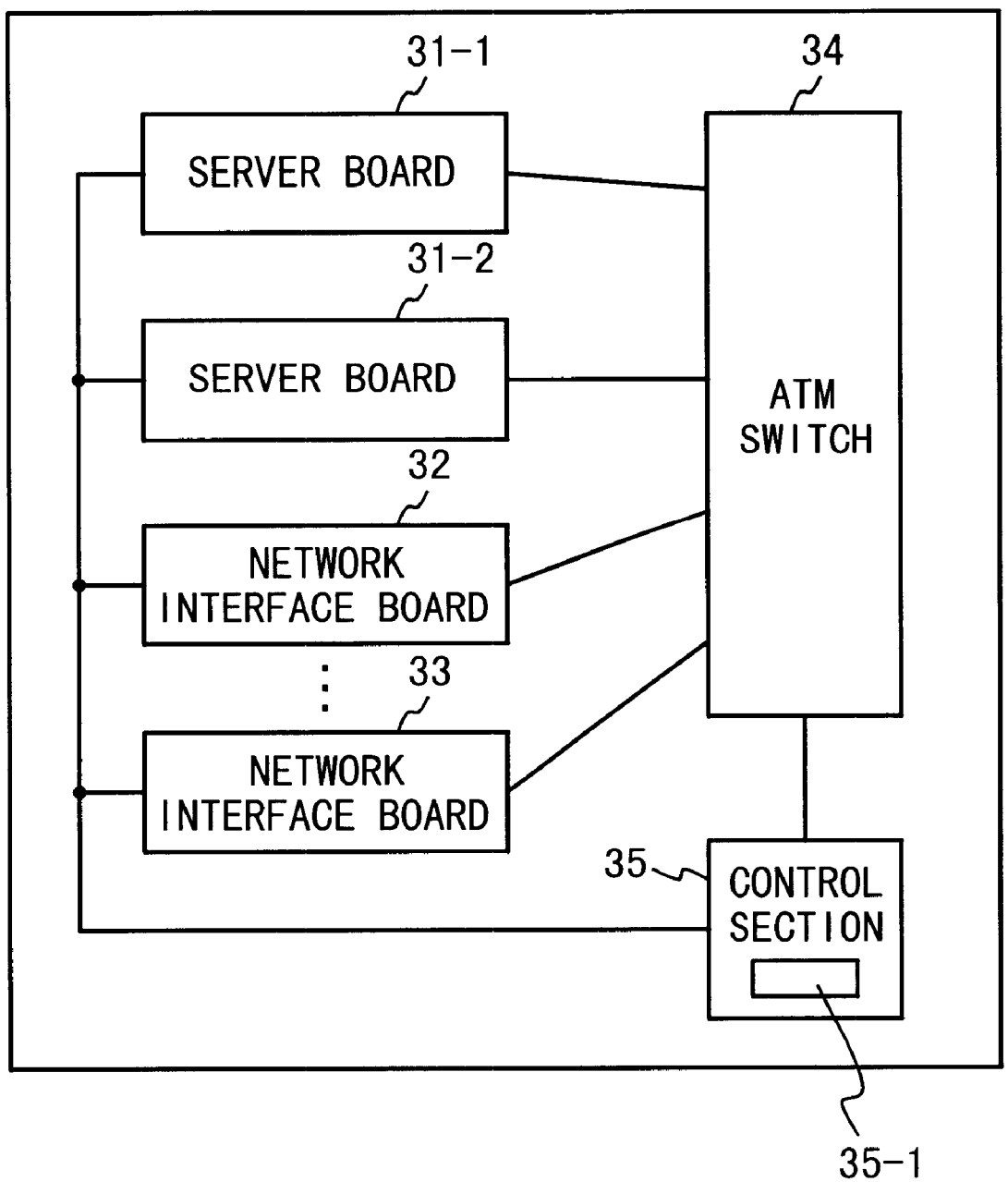
FIG. 5 is a block diagram illustrating the structure of the ATM switching apparatus according to a second embodiment of the present invention.

FIG. 5 is a block diagram illustrating the structure of the ATM switching apparatus according to the second embodiment of the present invention. The difference from the first embodiment is in that a plurality of server boards 31-1 and 31-2 are arranged to provide the same service.

The ATM switching apparatus is composed of the server boards 31-1 and 31-2, the network interface boards 32 and 33, the ATM switch 34 and the control section 35. The control section 35 includes a counter section 35-1 for counting the number of requests for every server boards. The control section 35 controls the ATM switch 34 such that the loads of the server boards 31-1 and 31-2 becomes substantially equal to each other, when a request is received by the ATM switching apparatus.

Figure 6:
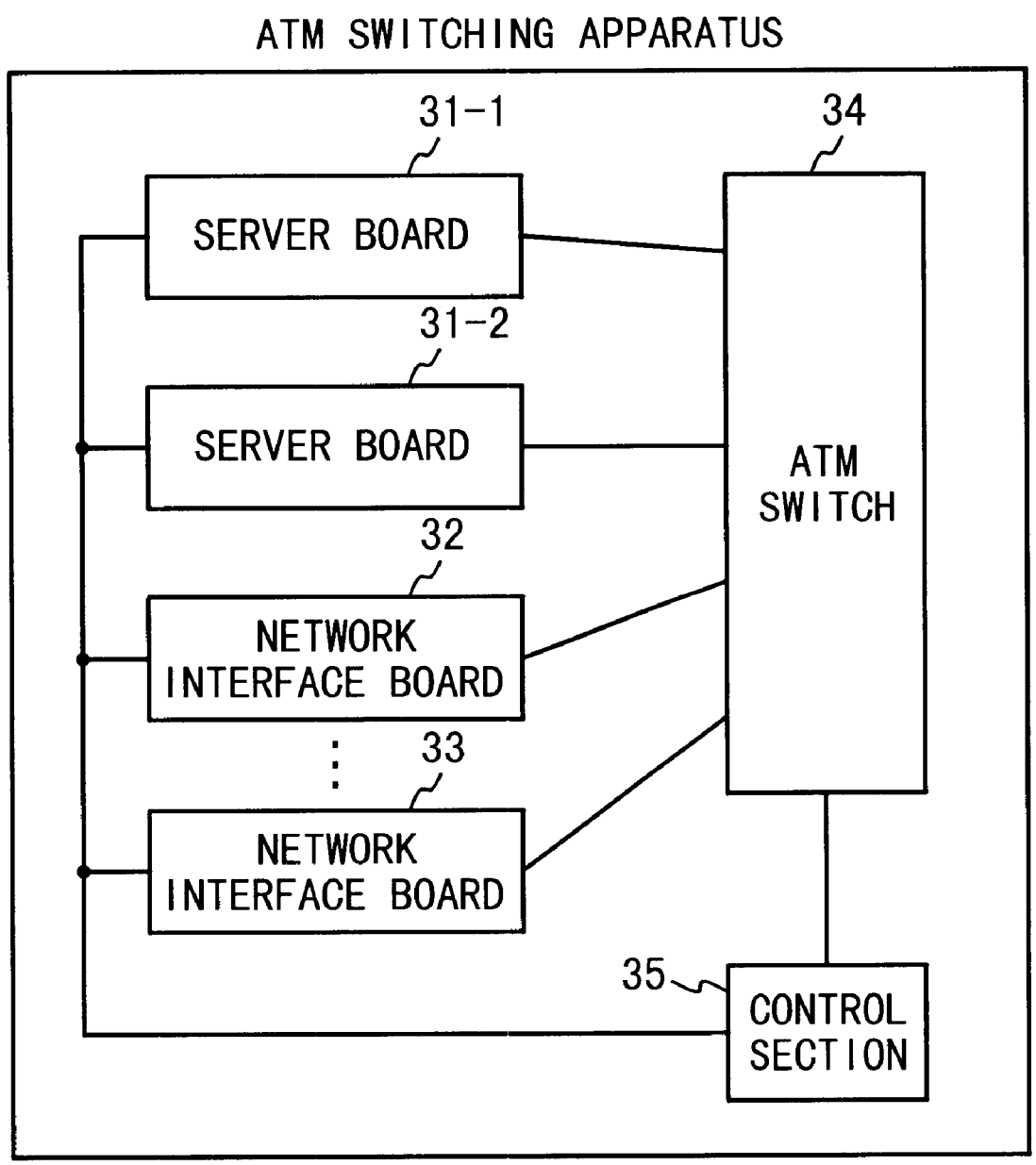
FIG. 6 is a block diagram illustrating the structure of the ATM switching apparatus according to a third embodiment of the present invention.

FIG. 6 is a block diagram illustrating the structure of the ATM switching apparatus according to the third embodiment of the present invention. The difference from the first embodiment is in that a plurality of server boards 31-1 and 31-2 are arranged to provide different services.

The ATM switching apparatus is composed of the server boards 31-1 and 31-2, the network interface boards 32 and 33, the ATM switch 34 and the control section 35. The control section 35 includes a counter section 35-1 for counting the number of requests for every server boards. The network interface board 32 or 33 informs the service corresponding to the cells to the control unit, and the control unit controls the path for the ATM cells based on the information.

As described above, according to the present invention, the server board is installed in a physical position where the network interface board can be installed. Therefore, the extension of the server board can be performed easily.

Also, according to the present invention, because the server processes are performed on the server board, the load of the control section is light so that the capability of the server does not decreases.

Further, according to the present invention, a plurality of server boards of a single type or a plurality types can be operated.

What is claimed is:

1. An asynchronous transfer mode (ATM) switching apparatus provided in a communication network, comprising:
   an ATM switch for switching a path for a cell;
   a control unit for controlling said ATM switch;
   a network interface board for interfacing between said ATM switch and a communication channel to and from a server; and
   a server board for receiving cells from said communication channel through said network interface board and said ATM switch under control of said control unit to provide a service, and for sending cells corresponding to said service such that said cells are sent to said communication channel through said network interface board and said ATM switch under control of said control unit.

2. An ATM switching apparatus according to claim 1, wherein said server board comprises:

a storage unit for storing a service software;

a converting unit for converting the received cells into a reception packet to store said reception packet in said storage unit and for converting a stored transmission packet to the sent cells to send to said ATM switch; and a processor for providing said service for said reception packet stored in said storage unit based on said service software to produce said transmission packet, and for storing said transmission packet in said storage unit.

3. An ATM switching apparatus according to claim 1, wherein said server board is installed in a physical slot in which said network interface board can be installed.

4. An ATM switching apparatus according to claim 2, wherein said server board is installed in a physical slot in which said network interface board can be installed.

5. An ATM switching apparatus according to claim 1, further comprising a plurality of said server boards including said server board.

6. An ATM switching apparatus according to claim 5, wherein said plurality of server boards provide the same service.

7. An ATM switching apparatus according to claim 6, wherein said control unit includes a counter section for counting a number of requests for said service, each of the requests corresponding to the received cells, and controls said path based on said counter section.

8. An ATM switching apparatus according to claim 5, wherein said plurality of server boards provide different services.

9. An ATM switching apparatus according to claim 8, wherein said network interface board informs the service corresponding to the cells to said control unit, and said control unit controls said path based on the information.

10. An ATM switching apparatus as claimed in claim 1, wherein said server board receives cells in accordance with an identifier.

\* \* \* \* \*